C. E. EGNÉR & R. F. FREDRIKSSON.
AERIAL ELECTRIC CABLE.
APPLICATION FILED DEC. 1, 1908.
960,291.
Patented June 7, 1910.
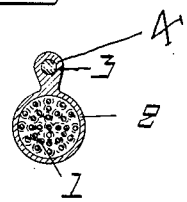
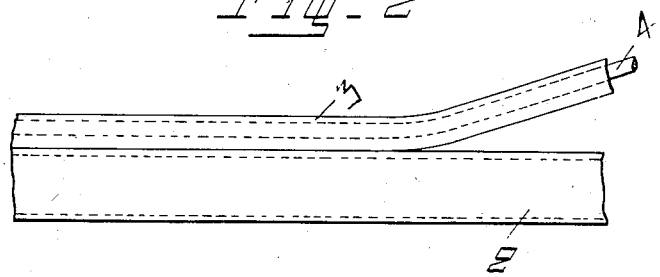

UNITED STATES PATENT OFFICE.

CARL EMIL EGNÉR, OF STOCKHOLM, AND REINHOLD FRITHIOF FREDRIKSSON, OF GOTTENBORG, SWEDEN.

AERIAL ELECTRIC CABLE.

960,291.  Specification of Letters Patent.  Patented June 7, 1910.

Application filed December 1, 1908. Serial No. 465,473.

*To all whom it may concern:*

Be it known that we, CARL EMIL EGNÉR, a subject of the King of Sweden, and resident of Blekingegatan 63 A, Stockholm, in the Kingdom of Sweden, engineer, and REINHOLD FRITHIOF FREDRIKSSON, a subject of the King of Sweden, and resident of Gottenborg, in the Kingdom of Sweden, engineer, have invented certain new and useful Improvements in Aerial Electric Cables, of which the following is a specification, reference being made to the accompanying drawing.

It has been heretofore proposed to attach electric cables to carrying ropes or wires in order that the cables may be suspended in the air without stretching the cable itself. The carrying rope or wire has usually been placed outside the cable and by means of binding wire or the like connected with the same, which arrangement however, has had the disadvantage, that the rope is wholly unprotected and in consequence of oscillations the sheathing of the cable is worn and the cable is thus likely to be injured. This mode of connection is also rather complicated and expensive. In certain other arrangements the rope is placed inside the cable, which arrangement is inconvenient in that the rope runs along the whole length of the cable and where the cable is not suspended in the air no carrying rope is required and is merely an unnecessary burden. Besides, in this case the cable cannot be suspended from the rope as the cable itself must be attached to its supports. According to our invention we overcome these several disadvantages by simultaneously providing the carrying rope or wire and the cable, in the lead press, with a lead-sheathing, which sheathings are integral, whereby a simple exterior connection between cable and rope is formed. This method of manufacture may be carried out very quickly and cheaply. The rope is protected and cannot leave the cable and as it lies outside the cable it can be loosened or removed in cases where it is not required.

In the accompanying drawing, Figure 1 is a transverse section and Fig. 2 an elevation of a cable embodying the present improvements.

1 is the core of conducting wires insulated from each other by means of paper, or in some other suitable manner, and 2 the lead-sheathing surrounding the core.

3 is a strong wire, a wire rope or the like, also surrounded by a lead-sheathing which is formed simultaneously with the lead-sheathing of the cable in such a way that both form one piece.

The rope 3 serves as a carrying rope when the cable is suspended in the air. In order to attach the rope to the supports it may be separated from the cable by cutting longitudinally the web by means of which the two lead-sheathings are connected, thus separating the same, as illustrated in Fig. 2. The suspending rope 3 with its lead casing may then be stretched by means of a wire stretcher, until a suitable deflection of the cable is obtained, without the cable itself being stretched whereby it could be injured, and when the rope has been suitably stretched it is fixed to its support. It will be obvious that instead of a single suspending rope, two or more such ropes may be employed, these being suitably arranged about the cable.

A cable constructed in the manner above described is specially advantageous for conductors in an elevated position against a wall. In such a case, the conductor may be attached to the wall by means of nails or the like, inserted between the cable and the suspending rope.

Having now described our invention, what we claim as new and desire to secure by Letters Patent is:—

In an electric cable the combination with a sheathing and conducting wires arranged therein, of means for suspending said cable comprising a sheathed carrier, the sheathing of which is integral with the sheathing of the cable.

In witness whereof we have hereunto set our hands in presence of two witnesses.

CARL EMIL EGNÉR.
REINHOLD FRITHIOF FREDRIKSSON.

Witnesses to the signature of Carl Emil Egnér:
EDITH OLSSON,
HJALMAR ZETTERSTRÖM.

Witnesses to the signature of Reinhold Frithiof Fredriksson:
GERLIZ SAUAUDER,
RUTH METTERWIK.